United States Patent

Nordbrock

[15] 3,697,859
[45] Oct. 10, 1972

[54] VOLTAGE REGULATOR CIRCUIT FOR A BRUSHLESS ALTERNATOR

[72] Inventor: Raymond E. Nordbrock, Villa Park, Ill.

[73] Assignee: Motorola, Inc., Franklin Park, Ill.

[22] Filed: May 21, 1971

[21] Appl. No.: 145,673

[52] U.S. Cl. ...................322/28, 322/73, 322/75, 323/24
[51] Int. Cl. .................................................H02p 9/30
[58] Field of Search...............322/28, 59, 61, 73, 75; 321/18, 24; 323/24

[56] References Cited

UNITED STATES PATENTS

| | | | |
|---|---|---|---|
| 3,289,069 | 11/1966 | Todd | 321/18 |
| 3,522,520 | 8/1970 | Goldman | 322/28 |
| 3,617,857 | 11/1971 | Gunderson | 322/28 |

Primary Examiner—Lewis H. Myers
Assistant Examiner—H. Huberfeld
Attorney—Vincent Rauner and R. J. La Porte

[57] ABSTRACT

A voltage regulator circuit for a brushless alternator includes voltage responsive circuitry having a zener diode. When the alternator output voltage drops sufficiently, a first transistor, normally in a state of conduction, is turned off to in turn, through a pair of transistors connected thereto, gate on a pair of oppositely poled silicon controlled rectifiers. The silicon controlled rectifiers, which are connected in series with the stationary primary winding of a rotary transformer mounted on the alternator shaft, pass a.c. current to the primary winding. The current flow in the transformer primary induces a current flow in the secondary which is rectified to excite the alternator field. Upon the voltage output of the alternator rising sufficiently to break down the zener diode of the voltage responsive circuitry, the first transistor and the transistors connected thereto are turned on, to gate off the silicon controlled rectifiers, thereby preventing further excitation of the field.

8 Claims, 1 Drawing Figure

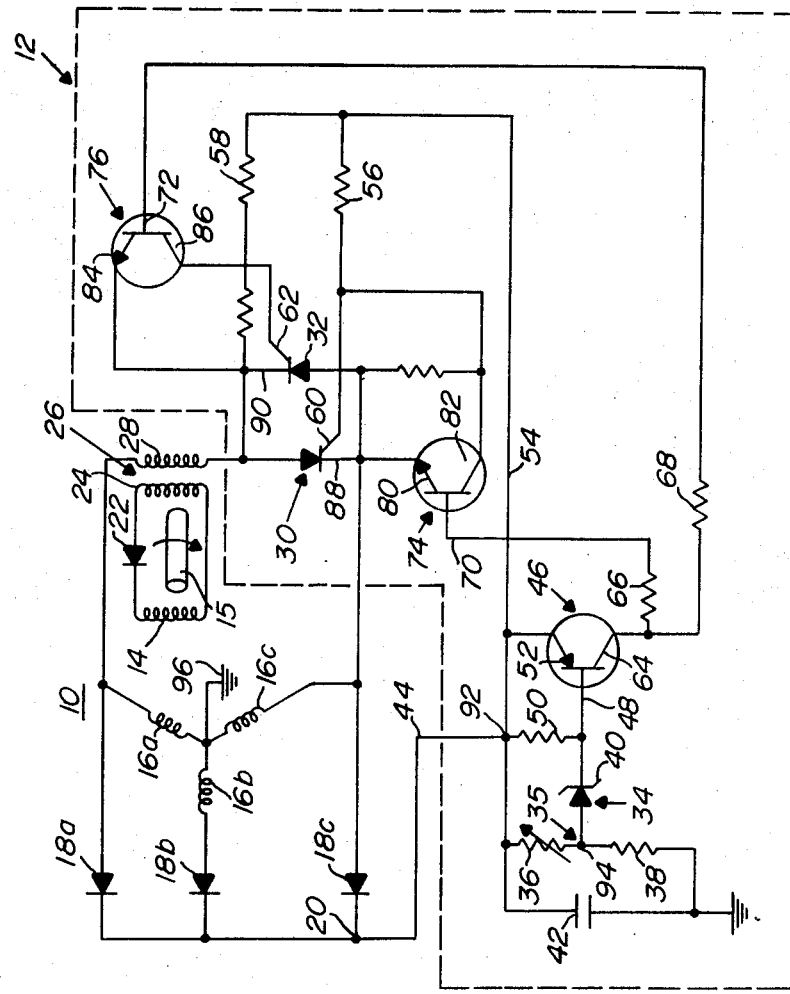

VOLTAGE REGULATOR CIRCUIT FOR A BRUSHLESS ALTERNATOR

BACKGROUND

This invention relates generally to voltage regulators and more particularly to electronic voltage regulator circuits for brushless alternators.

With the advent of the brushless alternator, the use of electromechanical type voltage regulators has slackened. The electromechanical type regulators are being replaced by electronic voltage regulator circuits which are more compatible with brushless type alternators and like the brushless alternators, having longer life than their predecessor.

While known electronic voltage regulator circuits operate satisfactorily for the most part to regulate the operation of brushless alternators, such voltage regulator circuits have generally been high in cost and in some instances, are not as reliable as desired.

SUMMARY

Accordingly, it is an object of the present invention to provide new and improved electronic voltage regulator circuitry for use with a brushless alternator.

It is another object of the invention to provide electronic voltage regulator circuitry which is relatively low in cost and high in reliability.

Briefly, a preferred embodiment of an electronic voltage regulator circuit for a brushless alternator according to the invention includes first voltage responsive circuitry having a zener diode. When the output voltage of the alternator drops sufficiently, a first transistor, normally in a state of conduction, is turned off. The turning off of the last-mentioned transistor turns off a pair of transistors connected thereto. In response to the latter, first and second silicon controlled rectifiers, each connected across the emitter, collector electrodes of one of the last-mentioned transistors, are gated on to permit alternating current from the alternator stator to flow through the stationary primary of a rotary transformer used to excite the field of the alternator. The secondary of the rotary transformer is mounted for rotation on the shaft of the rotating field winding of the alternator. The silicon controlled rectifiers are oppositely poled to pass positive and negative half cycles of the alternating current, respectively. The flow of alternating current through the transformer secondary induces a flow of current through the rotating primary which is then rectified in a conventional manner to excite the field of the alternator. When the voltage output rises sufficiently to break down the zener diode, the first transistor is caused to conduct. The pair of transistors connected to the first transistor are likewise caused to conduct to in turn gate off corresponding silicon controlled rectifiers. The latter stops the flow of alternating current through the transformer secondary to prevent further voltage rise at the output of the alternator.

DESCRIPTION OF THE DRAWING

The single FIGURE of the drawing is a schematic circuit diagram of a brushless alternator employing regulator circuitry according to the invention.

DETAILED DESCRIPTION

Referring now to the single figure of the drawing, there is illustrated schematically a brushless alternator, designated generally by the numeral 10 and employing a regulator circuit according to the invention, shown in dotted lines and designated by the numeral 12, for regulating the output of the alternator and/or the charging of a battery connected thereto.

The alternator includes the usual rotating field winding 14 mounted on rotor shaft 15 and three phase stationary stator winding 16a, 16b, 16c, connected in a wye configuration. It should be noted that the alternator stator must be wye connected to make use of the regulator circuit according to the invention. It must be connected in this fashion to provide a ground connection necessary for the operation of the regulator circuit. Rectification diodes 18a, 18b, 18c are connected to the output of the stator winding to provide a d.c. output at point 20 of the alternator. A battery or other load may be connected at output 20.

The rotating field winding 14 of the alternator is connected through a diode rectifier 22 to the rotating secondary 24 of a rotary transformer 26, also mounted on the rotor shaft 15, which supplies excitation current for the alternator field. While only a single diode 22 is shown to provide half-wave rectification, this is only representative of a rectification means required and a full-wave rectifier may be used if desire. The stationary primary 28 of the rotary transformer is connected in series with two phases 16a, 16c of the alternator stator winding and to the voltage regulating circuit 12 through a pair of unidirectional current passing components, herein taking the form of silicon controlled rectifiers 30, 32. Current from phases 16a, 16c is supplied to the transformer primary winding 28 for use in excitation of the field of the alternator.

The voltage regulating circuit 12 according to the invention includes voltage responsive sensing circuitry 34 including a voltage divider network 35 comprising variable resistor 36 and resistor 38, and a zener diode 40, the anode of which is connected therebetween. The mentioned components are provided to govern the regulation of the alternator output. A filtering capacitor 42 is connected in parallel with the voltage divider network 35. The last-mentioned sensing circuitry is connected via lead 44 to the output 20 of alternator 10.

A transistor 46 is connected at its base electrode 48 to the cathode of zener diode 40, and a biasing resistor 50 is connected between the base and the emitter electrodes, 48, 52, respectively, of the last-mentioned transistor. Both the emitter 52 and the resistor 50 are connected to a common power lead 54 which is also connected through current limiting resistors 56, 58 to the gate electrodes 60, 62, respectively, of silicon controlled rectifiers 30, 32.

The collector electrode 64 of transistor 46 is connected through resistor 66, 68, to the base electrodes 70, 72, of a pair of transistors 74, 76, respectively, which serve to operate the silicon controlled rectifiers 30, 32, respectively. The emitter and collector electrodes 80, 82 and 84, 86 of the transistors 74, 76, respectively, are connected across the cathode and gate electrodes 88, 60 and 90, 62, respectively, of the silicon controlled rectifiers.

For purposes of affording a more complete understanding of the invention, it is advantageous now to provide a functional description of the mode in which the component parts thus far described cooperate. When the voltage at point 92, connected to the output is of the alternator, exceeds the sum of the voltage at junction 94 and the breakdown voltage of zener diode 40, diode 40 breaks down and the voltage at base electrode 48 of transistor 46 becomes negative with respect to the voltage at emitter 52. Transistor 46 is thereby turned on. The turning on of the last-mentioned transistor provides, through the respective resistors 66, 68, bias voltage to the bases 70, 72 of transistors 74, 76, to operate the transistors to an on condition. The turning on of the transistors provides a path from power lead 54 through the collector-emitter junctions of the transistors 72, 74, respectively, to ground 96 of the alternator stator. This shunts the current from power lead 54 away from the gate electrodes 60, 62 of the silicon controlled rectifiers, thereby gating them off to block current flow from phases 16a, 16c of the stator winding through the stationary winding 28 of rotary transformer 26. With no current flowing in the transformer winding, the field 14 of alternator 10 is not excited and the output of the alternator drops.

Upon the voltage at junction 92 falling below the sum of the voltage at junction 94 and the zener breakdown voltage, due to the discharge of capacitor 42 and a general decay of the voltage in stator winding 16a, 16b, 16c, zener diode 40 is turned off. The turning off of diode 40 makes the voltage at the base 48 of transistor 46 substantially equal to that at the emitter 52, and turns off the transistor 46. The turning off of transistor 46 likewise turns transistor 72, 74 to the off condition, removing the current path to ground 96 therethrough. With the latter path removed, silicon controlled rectifiers 30, 32 are gated on via lead 54. The silicon controlled rectifiers provide a path for a.c. current from phases 16a, 16c of the stator winding through the stationary winding 28 of the rotary transformer. Silicon controlled rectifier 30 passes one half cycle of the a.c. current through winding 28 and silicon controlled rectifier 32 passes the other half cycle. The current flow through winding 28 includes an a.c. current flow in rotating transformer winding 24 of the rotary transformer, which is rectified by diode 22 to provide a d.c. excitation of field 14.

With the field excited, the output of alternator 10 rises once again to charge a battery, power a load, etc. Likewise, the voltage at point 92 rises until it again exceeds the sum of the voltage at junction 94 and the breakdown voltage of zener diode 40. The operation of the regulator 12 is then repeated to maintain a relatively constant output of alternator 10.

It should be noted that by varying the resistance of variable resistor 36 and/or by replacing zener diode 40 with a zener diode having a different breakdown voltage value, the regulation voltage of the alternator may be changed accordingly.

Thus, the regulating circuit according to the invention provides a relatively simple, reliable means for regulating the output of a brushless alternator. While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a brushless alternator including rotary transformer means having a first fixed winding and a second winding rotatable in accordance with the rotor shaft of the alternator and current supply means connected to the first winding, a voltage regulator circuit including in combination; voltage responsive means connected to the output of the alternator to sense the voltage value thereof and controlled bidirectional current passing means connected between said current supply means and said first winding, and to said voltage responsive means, said bidirectional current passing means being operable to pass current from said supply means through said first winding to excite the field of said alternator in response to the voltage at said output being less than a predetermined value.

2. A brushless alternator as claimed in claim 1 wherein said controlled bidirectional current passing means include a pair of oppositely poled unidirectional current passing components.

3. A brushless alternator as claimed in claim 2 wherein said unidirectional current passing components include a pair of silicon controlled rectifiers connected in parallel relation with each other and in series with said first winding.

4. A brushless alternator as claimed in claim 3 wherein said controlled bidirectional current passing means further include a pair of transistors, each having base, collector and emitter electrodes, the base electrodes of said transistors coupled to said voltage responsive means and the collector and emitter electrodes of each said transistor being connected to the gate and cathode, respectively, of one of said silicon controlled rectifiers, whereby upon operating said transistors to an on condition, said silicon controlled rectifiers are gated off and upon operating said transistors to an off condition, said silicon controlled rectifiers are gated on.

5. A brushless alternator as claimed in claim 3 wherein said voltage responsive means include a zener diode, said zener diode breaking down upon the voltage at the output of said alternator rising above said predetermined voltage value, thereby to cause said pair of transistors to be biased to an on condition, thereby to gate said silicon controlled rectifiers to an off condition, preventing further excitation of said field.

6. A brushless alternator as claimed in claim 4 wherein said current supply means include predetermined phases of the stator winding of said alternator.

7. In a brushless alternator including a three phase, wye connected stator winding, a rotor shaft, a field winding mounted for rotation on said rotor shaft and a rotary transformer having a first fixed winding and a second winding rotatable with said rotor shaft and coupled to said fixed winding, a voltage regulator circuit including in combination; voltage responsive means connected to the output of said alternator, said voltage responsive means including a transistor, and a pair of oppositely poled silicon controlled rectifiers connected in parallel relation with respect to each other and in series with said fixed winding of said rotary transformer, and coupled to the output of the transistor of said voltage responsive means, said silicon controlled rectifiers being operable to pass current from predetermined phases of the alternator stator winding through said fixed transformer winding for excitation of said field winding upon the output voltage of said alternator being of a magnitude sufficient to turn off the transistor of said voltage responsive means, and said silicon controlled rectifiers being operable to block field excitation current from said stator winding when the output voltage of said alternator is of such a magnitude so as to turn said transistor on.

8. A brushless alternator as claimed in claim 7 wherein said voltage responsive means further include a zener diode coupled to the output of said alternator and said transistor, whereby upon the voltage of said output rising above predetermined magnitude, said zener diode breaks down to turn on said transistor, thereby causing said silicon controlled rectifiers to block excitation current from said field winding and upon the voltage of said output falling below said predetermined magnitude, said zener diode being turned off to turn off said transistor, thereby causing said silicon controlled rectifiers to permit the passage of excitation current from said stator to said field winding.

* * * * *